(12) United States Patent
Irvine et al.

(10) Patent No.: US 7,569,304 B2
(45) Date of Patent: Aug. 4, 2009

(54) FUEL CELLS AND RELATED DEVICES

(75) Inventors: John Thomas Sirr Irvine, Fife (GB); Frances Gwyneth Elaine Jones, Dundee (GB); Paul Alexander Connor, St. Andrews (GB)

(73) Assignee: The University Court of The University of St. Andrews, St. Andrews (GB)

( * ) Notice: Subject to any disclaimer, the term of this patent is extended or adjusted under 35 U.S.C. 154(b) by 617 days.

(21) Appl. No.: 10/492,877

(22) PCT Filed: Oct. 18, 2002

(86) PCT No.: PCT/GB02/04726

§ 371 (c)(1),
(2), (4) Date: Apr. 16, 2004

(87) PCT Pub. No.: WO03/036746

PCT Pub. Date: May 1, 2003

(65) Prior Publication Data

US 2004/0247970 A1    Dec. 9, 2004

(30) Foreign Application Priority Data

Oct. 20, 2001  (GB) ................................. 0125276.6

(51) Int. Cl.
*H01M 4/00* (2006.01)
*H01M 6/00* (2006.01)
*H01M 8/10* (2006.01)
*C25C 5/04* (2006.01)
*C25C 7/00* (2006.01)
*C25B 9/00* (2006.01)
*C25D 17/00* (2006.01)
*B23H 11/00* (2006.01)
*C25F 7/00* (2006.01)

(52) U.S. Cl. .............................. 429/94; 429/30; 429/31; 429/32; 429/33; 204/267; 204/272; 204/275.1; 204/278.5

(58) Field of Classification Search ................... 429/94, 429/30, 31, 32, 33; 204/267, 272, 275.1, 204/278.5
See application file for complete search history.

(56) References Cited

U.S. PATENT DOCUMENTS 5,057,362 A    10/1991   Schroeder et al.

(Continued)

FOREIGN PATENT DOCUMENTS

EP    0 497 633    8/1992

(Continued)

OTHER PUBLICATIONS

Majumdar, S., et al., "Stress and Fracture Behavior of Monolithic Fuel Cell Tapes." Journal of the American Ceramic Society, 69[8] 628-33 (1986).

(Continued)

*Primary Examiner*—Patrick Ryan
*Assistant Examiner*—Eugenia Wang
(74) *Attorney, Agent, or Firm*—Drinker, Biddle & Reath LLP

(57) ABSTRACT

A solid electrolyte fuel cell component is formed by tape casting an electrolyte layer and electrode layers to form a green tape which can be manipulated. The green tape is coiled into a form having an S-shaped central portion having oppositely-directed loops, so as to provide a first longitudinal channel presenting an anode surface and a second longitudinal channel presenting a cathode surface. After coiling, the assembly is fired to produce a solid, sintered product.

7 Claims, 4 Drawing Sheets

U.S. PATENT DOCUMENTS

| | | | |
|---|---|---|---|
| 5,094,928 A | 3/1992 | Dyer | 429/33 |
| 5,323,527 A * | 6/1994 | Ribordy et al. | 29/623.1 |
| 5,922,486 A | 7/1999 | Chiao | |
| 6,228,520 B1 | 5/2001 | Chiao | |

FOREIGN PATENT DOCUMENTS

| | | |
|---|---|---|
| EP | 1 394 885 | 3/2004 |
| WO | WO 94/22177 | 9/1994 |

OTHER PUBLICATIONS

Minh, N.Q. "Ceramic Fuel Cells." Journal of the American Ceramic Society, 76[3] 563-88 (1993).

Minh, N.Q., et al., "Science and Technology of Ceramic Fuel Cells." AlliedSignal, Inc., Aerospace Equipment Systems, Torrance, CA, USA, 1995.

Moon, J.W., et al., Fabrication of Electrode/Electrolyte Layer With Novel Microstructure Using Artificial Pore Former. Ceramic Processing Center, Korean Institute of Science and Technology.

* cited by examiner

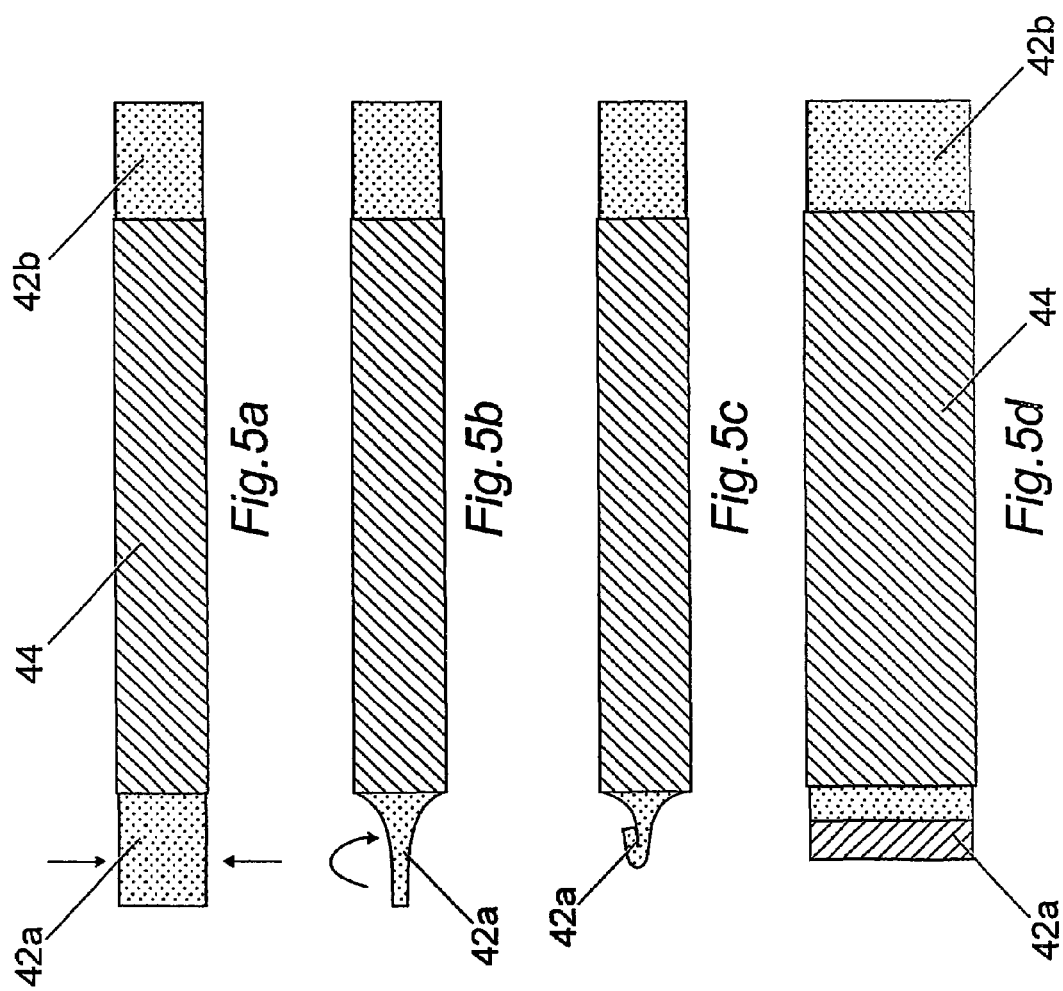

FUEL CELLS AND RELATED DEVICES

BACKGROUND OF THE INVENTION

This invention relates to solid oxide fuel cells, and to devices similar to fuel cells for use in electrocatalysis and electrolysis in gas based processes.

Despite considerable research and development effort, fuel cells have not yet been successfully commercialized. Gradual progress has been made in developing solid oxide fuel cells in two basic arrangements, flat plate and tubular but costs remain high and there are sealing and interconnect problems.

The present invention seeks to provide a radical means of addressing these problems.

SUMMARY OF THE INVENTION

The present invention provides, in one aspect, a method of making a component having an anode, a cathode and a solid electrolyte, the method comprising using tape casting to produce a green tape which is cohesive but flexible and firing the green tape to produce a rigid component; the green tape comprising at least three layers each of which is derived from a respective slurry comprising metal/ceramic particles dispersed in a carrier liquid.

From another aspect, the invention provides a component for use in a fuel cell or an electrochemical device, the component having a generally elongate tubular form divided by a central web into two channels, one of the channels presenting an anode surface to material flowing therethrough, and the other channel presenting a cathode surface to material flowing therethrough, the component further comprising a solid electrolyte between said anode and cathode.

The invention further provides fuel cells comprising components in accordance with, or made by the method of, the invention.

Preferred features of the invention and its advantages will be apparent from the following description and claims.

Embodiments of the invention will now be described, by way of example only, with reference to the drawings, in which:

BRIEF DESCRIPTION OF THE FIGURES

FIG. 5A is a side view of a modified form of fuel cell component;

FIG. 5B is a side view of the modified component following a first step to produce a seal at one end; and FIGS. 5C and 5D are side and plan views, respectively, of the component following a second step.

DETAILED DESCRIPTION OF CERTAIN ILLUSTRATIVE EMBODIMENTS

Figure 1:
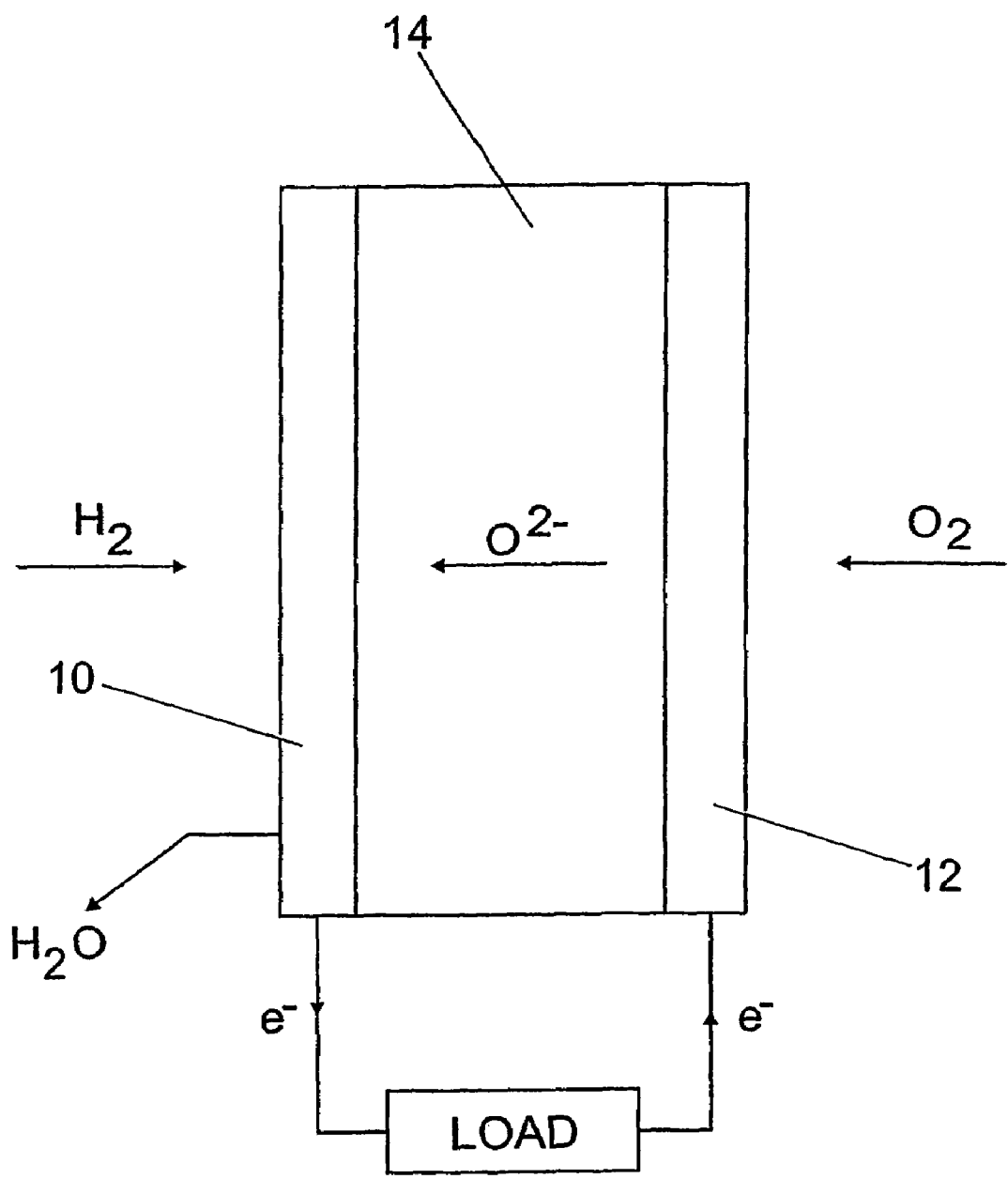
FIG. 1 illustrates the construction and operation of a known type of fuel cell.

Referring to FIG. 1, a solid oxide fuel cell comprises an anode 10, a cathode 12, and a solid electrolyte 14. The cell produces electricity by electrochemically combining hydrogen (which may be present as such, or in a hydrocarbon fuel) and oxygen (which may be present as such or in air). The oxygen is reduced at the cathode 12, accepting electrons from the external circuit to form $O^{2-}$ ions (equation (1)) which are conducted through the solid electrolyte 14 to the anode 10. At the anode/electrolyte interface, hydrogen is oxidised to form $H_2O$, releasing electrons back into the external circuit (equation (2)).

$$O_2 + 4e^- \leftrightharpoons 2O^{2-} \quad (1)$$

$$2H_2 + 2O^{2-} \leftrightharpoons 2H_2O + 4e^- \quad (2)$$

Each of the three components must not react with any other component it is in contact with, must be stable at operating temperatures, and all three must have similar thermal expansions. The anode 10 and cathode 12 need high electronic conductivity and sufficient porosity to allow the gases to reach the electrode/electrolyte interface. In comparison, the electrolyte must be dense, preventing gas flow, have high oxygen ion conductivity, allowing $O^{2-}$ ions to permeate with minimum resistance, and as small an electron transport number as possible.

One known family of fuel cells uses yttria stabilised zirconia (YSZ). The anode consists of YSZ mixed with Ni, and the cathode of YSZ mixed with Sr doped $LaMnO_3$. This serves to obtain similar thermal expansion to the electrolyte, and also acts to increase the triple phase boundary (the area of contact between anodic/cathodic material, electrolytic material, and the gas phase).

Two main types of fuel cell exist at present. One is the planar cell, in which flat plates in the geometry shown in FIG. 1 are stacked one on top of another separated by an interconnect. The other is tubular, in which the materials are formed into tubes with the inside surface cathode and the outer surface anode. Air and fuel (hydrogen source) are passed over the corresponding electrodes.

Preferred Embodiments

Figure 2:
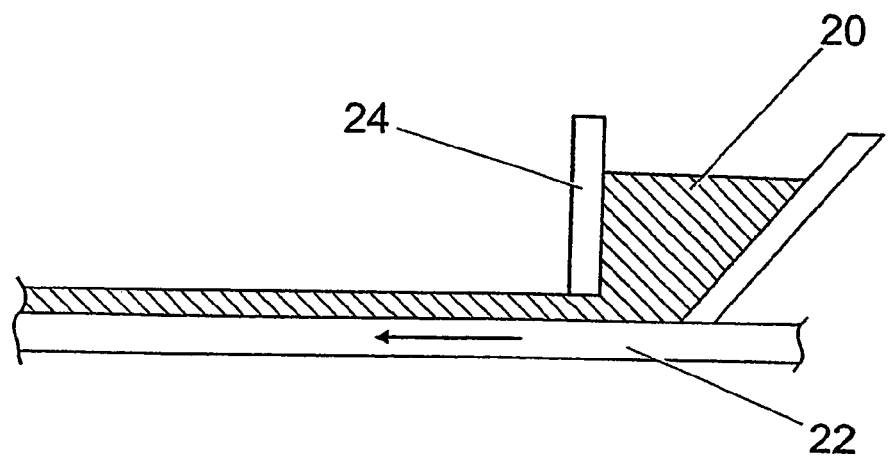
FIG. 2 is a schematic side view showing an apparatus used for tape casting.

Turning to FIG. 2, the present invention makes use of a process of tape casting to form the electrode and electrolyte structures. Tape casting as a process is known per se, see for example 'Tape Casting Theory and Practice' by Richard E Mistler and Eric R Twiname, but has previously been used in the field of fuel cells only to manufacture single layers such as anodes or cathodes.

Tape casting is the production of thin sheets of ceramic and/or metallic material. The ceramic/metallic powders are mixed by ball mill together with various organic materials: solvent, dispersing agent, binder and plasticizer which hold the individual particles in a homogeneous distribution throughout the slurry.

As seen in FIG. 2, the slurry 20 is cast onto a moving carrier surface 22 by a doctor blade 24. The carrier surface 22 may suitably be a glass plate or Mylar sheet. Upon evaporation of the solvent, a flexible 'green' tape is produced which may be handled and manipulated. The green tape is subsequently fired, removing the remaining organic material and producing a hard, rigid sintered material.

The ball milling stage is important to ensure that all the soft agglomerates are broken down and the powder is well dispersed. The ball milling is normally performed on the powder, solvent and dispersant; the binder and plasticizer added subsequently, and the entire mix may undergo further ball milling but at a slower speed. De-airing the slurry and maintaining a constant casting speed ensure constant thickness and smooth surface finish of the green tapes.

Figure 3:
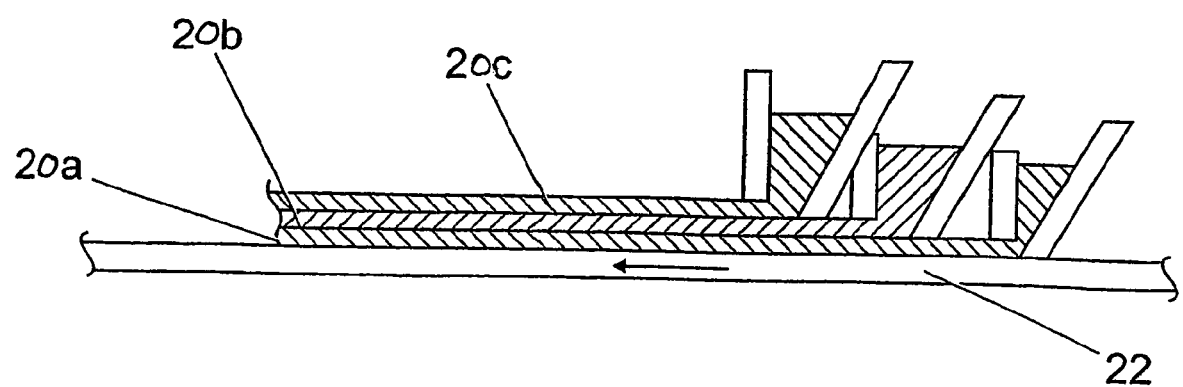
FIG. 3 is a similar view of an apparatus used in the invention.

FIG. 3 shows an apparatus in which three slurries 20a, 20b, 20c are cast sequentially on a single carrier surface 22, thus producing a three-layer green tape which can be handled as a single unit and fired to produce a rigid unitary structure. By using suitable materials in the three slurries, a fuel cell component comprising anode, cathode and solid electrolyte is produced. A preferred composition is:

| anode | YSZ and NiO which is reduced to Ni under fuel conditions |
|---|---|
| cathode | YSZ and Sr doped $LaMnO_3$ |
| electrolyte | YSZ (8-10 mol % yttria, balance zirconia) |

One alternative to the multiple casting arrangement of FIG. 3 is as follows. The electrolyte layer is deposited first, and one electrode layer is deposited on top, once the electrolyte layer has partially dried. This composite is allowed to dry somewhat, after which the two-layer composite is turned over and the second electrode layer deposited on top.

Another alternative is to produce three separate ribbons by tape casting, and combine these by stacking and applying pressure, for example by passing between rollers. This has the advantage of further reducing the electrolyte thickness.

The three layer structure produced by any of the foregoing methods forms a single component which can be handled and fired as a unit (co-fired). This contrasts with prior art use of tape casting, where each electrolyte or electrode layer is formed and fired separately.

These fuel cell components can be produced simply by tape casting and firing, resulting in flat plate components. However, the invention also provides a novel form of fuel cell which is made possible by the use of tape casting.

Figure 4:
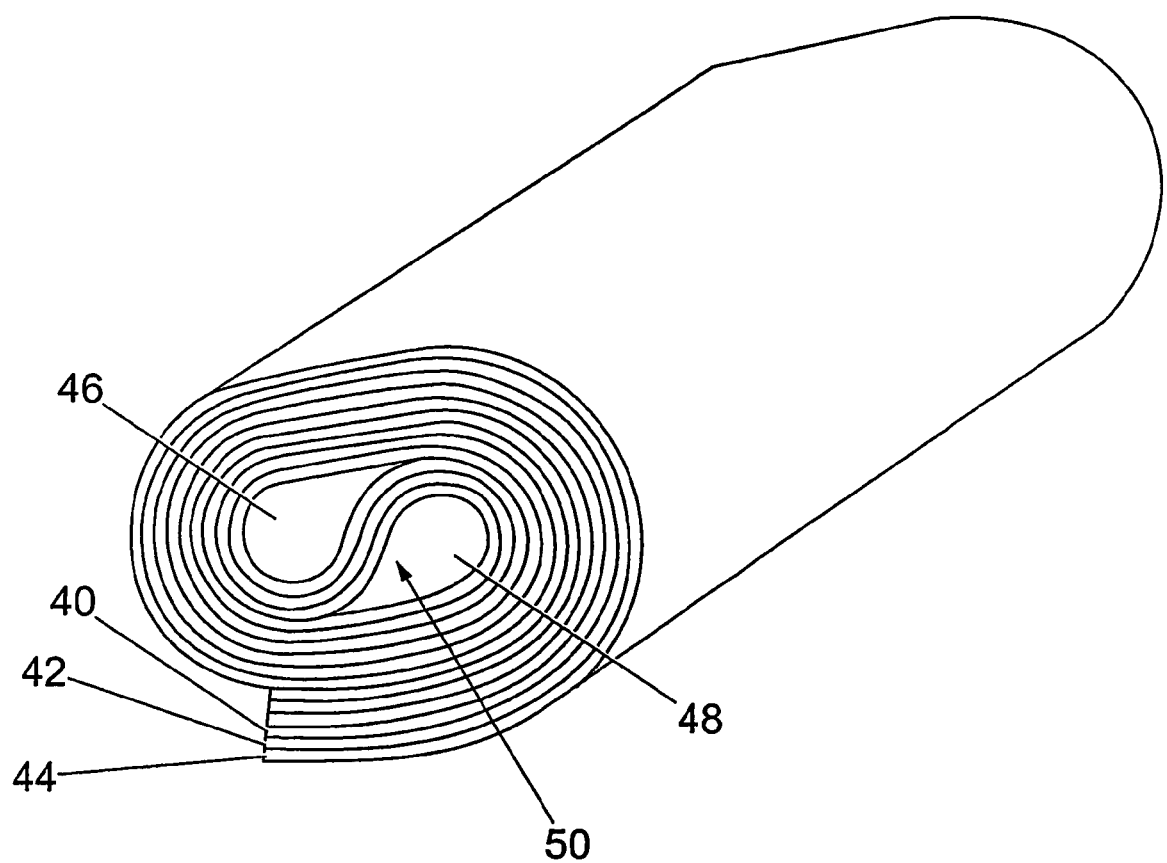
FIG. 4 is a schematic perspective view of a fuel cell component in accordance with the invention.

Referring to FIG. 4, a three layer tape having anode 40, electrolyte 42 and cathode 44 is wound while in the green state prior to firing. The winding is such as to produce oppositely-directed loops in an S-shape in the centre of the component, thus forming longitudinal channels 46 and 48 separated by a central web 50. One channel 46 has a surface of anode material 40, while the other channel 48 has a surface of cathode material 44. Typically, the overall cross-section of the wound component may be about 50 mm, and the channels 46 and 48 each have a width of about 5 mm. The component may be wound from a tape 0.2 m×2 m.

In use, air is passed through the channel 48 to contact the cathode 44, and hydrogen (or a hydrogen-containing fuel) is passed through the channel 46 to contact the anode 40. The anode and cathode are porous, preferably about 50% porosity, and thus the air and hydrogen permeate through the anode and cathode layers and are not simply in contact with the parts fronting the channels 46 and 48.

The arrangement shown in FIG. 4 thus provides a fuel cell component which is simple to make, gives a large active area within compact dimensions, and combines the best features of flat plate and tubular fuel cell geometries.

FIG. 5 illustrates a modification of the embodiment of FIG. 4. This makes use of the fact that the electrolyte layer 42 is dense and impermeable. In FIG. 5, the electrolyte layer 42 is of greater width than the electrode layers 40 and 44 and thus forms projecting portions 42a, 42b when the layers are wound or coiled. The projecting portion 42a is pressed (FIG. 5A) to form a flattened end (FIG. 5B) which is then turned over (FIGS. 5C and 5D) to form a seal, in the manner of a toothpaste tube. The assembly is then fired to form a rigid component sealed at one end.

The projecting portion 42b at the other end may be used for connecting the component to a gas supplies such as fuel and air manifolds.

Choice of Materials

The foregoing embodiment is based upon the use of YSZ materials. Such materials are presently preferred in carrying out the invention, and it is believed that the use of high-zirconia materials will be of particular benefit when using co-firing of multiple tape layers. However, other materials may be used in implementing the invention.

The electrolyte should be an ionically conducting oxide capable of transporting either oxygen ions or protons or both. Typical materials in addition to yttria-zirconia are scandia-stabilised zirconia, cerium oxide based materials, lanthanum gallate materials, and oxide proton conductors such as barium cerate, strontium zirconate, and other perovskites based on cerium, niobium or zirconium, and titanium containing alkaline earth strontium or barium or rare earths or yttrium or scandium.

Alternative air electrode materials would be based on lanthanum strontium cobaltate, lanthanum strontium iron oxide, and various combinations of manganese cobalt and iron in the same perovskite lattice.

The fuel electrode in addition to nickel zirconia cermets may use copper zirconia cermets, copper ceria cermets, nickel ceria cermets, perovskites based on lanthanum chromate, and fluorites based on yttria zirconia titania either on their own or in combination with a current collecting material.

In summary, the invention may be applied to any oxide fuel cell having an electrolyte with solely oxide or/and proton ionic activity and electrodes with appropriate catalytic, electronic and ionic activity to function in the reduction of air (or oxygen or other oxidant) and the oxidation of hydrogen, hydrocarbon, reformed hydrocarbon or other appropriate fuel.

Process Examples

Some specific examples of tape casting YSZ-based slurries and tape processing will now be given.

Two sources of YSZ powder have been used. A first powder was obtained from Pi-Kem Ltd and has the following analysis:

TABLE 1

| | wt % |
|---|---|
| $Y_2O_3$ | 13.62 |
| $SiO_2$ | 0.01 |
| $TiO_2$ | 0.002 |
| $Fe_2O_3$ | 0.003 |
| CaO | 0.002 |
| $Al_2O_3$ | 0.25 |
| $Na_2O$ | 0.003 |
| LOI | 0.07 |
| Balance: | Zirconia |
| Average particle size: | 0.21 µm |
| Surface area: | 6.9 $m^2/g$ |

The other powder was by Tioxide Ltd; no analysis is available. The powder by Tioxide Ltd was premixed with a binder, but the binder was removed by heating at 600° C. overnight.

Particle size distribution was measured, without de-flocculation, by an LS Particle Size Analyser with detection limits of 0.4 µm to 2000 µm. 10 second ultrasonic agitation was performed prior to detection. The largest particles detected were 4 µm (Pi-Kem Ltd) and 5 µm (Tioxide Ltd) and both powders contained particles smaller than 0.4 µm. The LS Particle Size Analyser showed the mode particle size to be 1.43 µm (Pi-Kem Ltd) and 1.72 µm (Tioxide Ltd).

A number of dispersing agents were investigated, namely tri-ethanol amine, citric acid, menhaden fish oil, oleic acid, phosphate ester (acid form), and polyethylene glycol. Tri-ethanol amine was found to work well with the Tioxide Ltd product, and phosphate ester (acid form) with the Pi-Kem Ltd product provided the quantity was kept below 1.5, preferably 0.05-0.12, g per 10 g of YSZ.

Tapes were produced using a planetary ball mill and YSZ by Tioxide Ltd, with polymethyl methacrylate (PMMA) and polyvinyl butyral (PVB) as binders. The slurry compositions were as follows:

TABLE 2

|  | Chemical | Mass/g (2 dp) |
| --- | --- | --- |
| a) Binder: PMMA | | |
| Powder | YSZ (Tioxide Ltd) | 10.00 |
| Solvent | Methyl ethyl ketone/ethanol (6:4 wt %) | 5.20 |
| Dispersant | Tri-ethanol amine | 0.25 |
| Binder | PMMA | 2.24 |
| Plasticizers | Polyethylene glycol (MW 300) | 1.62 |
|  | Di-butyl phthalate | 1.46 |
| b) Binder: PVB | | |
| Powder | YSZ (Tioxide Ltd) | 10.00 |
| Solvent | Methyl ethyl ketone/ethanol (6:4 wt %) | 5.20 |
| Dispersant | Tri-ethanol amine | 0.24 |
| Binder | PVB | 1.12 |
| Plasticizers | Polyethylene glycol (MW 300) | 0.81 |
|  | Di-butyl phthalate | 0.73 |

The tapes produced were flexible, with less binder required when using PVB, showing PVB to have better binding properties. For both tapes, ease of removal was better from a glass carrier than from a Mylar® carrier.

Tapes with PVB binder were noted to be 'sticky' and if coming into contact with themselves were difficult to prise apart. TGA analysis showed both binders were completely removed by 600° C.

The tapes were cut into sections and subjected to various firing rates and temperatures. They were fired flat, onto a Safil firing block.

Slow heating of 1.5° C./min to 600° C., removing the organic-material, greatly increased tape porosity. The PMMA binder tape has a larger pore size than the PVB binder tape, due to the higher binder: powder ratio. Both tapes were very brittle.

Slow heating of 1.5° C./min to 600° C., rapidly heating to 1000° C. (11.5° C./min) and holding at this temperature for 5 hours, again showed the tapes produced with PMMA binder to be more porous. Comparison to the tapes heated to 600° C. show a decrease in porosity after the temperature increase as the tapes contracted. The tapes were less brittle after firing at 1000° C., but were still easily broken.

Tapes were subjected to rapid heating of 11.5° C./min to 1000° C. and holding at this temperature for 5 hours. The tapes are still porous, but interestingly, there is an obvious decrease in porosity for tapes from PMMA binder and an increase in porosity for tapes from PVB binder without the slow binder removal stage. Again, these tapes were brittle.

Sintering at 1500° C. for 5 hours after slow binder removal reduced porosity further. The thickness was 124 µm (PVB binder) and the porosity of the PMMA tape to be much higher—reflected by the greater strength of the PVB binder tape. Both tapes sintered well. Impurities and many holes were present on both tapes. Impurities could be due to dust particles, or Si particles picked up from the furnace block.

A small sample of green tape was rolled according to the geometry in FIG. 4, and fired to 1500° C. Although the above flat tapes showed a smooth surface finish, the rolled tapes did not. This was thought to be due to too fast a heating rate causing the organic material to bubble leaving bumps on the surface.

Intense mixing of the planetary ball mill is thought to have adverse effects on the binder and further tapes were produced using PVB binder for YSZ obtained from both Pi-Kem Ltd and Tioxide Ltd, with the rotary ball mill.

Green tapes produced with YSZ (Tioxide Ltd) by rotary and planetary ball mill were compared. Both ball mills produced a similar homogenous particle distribution, although more 'lumps' are seen in the planetary ball milled tape. This is possibly due to the more effective mixing of the planetary ball mill meaning the slurry was mixed for too long. Mixing of the slurry after binder addition for too long has the effect of producing less dense tapes, due to the substitution of the dispersant by the binder causing the 'zipper bag' effect, where the binder wraps around a group of particles to form an agglomerate.

The tapes were heated at 0.8° C./min to 600° C., then to 1000° C. at 1.5° C./min, followed by 3.5° C./min to 1500° C. and sintered at 1500° C. The thickness of the tape sintered at 1500° C. was found to be much less than the planetary ball milled sample at 82 µm. Halving doctor blade gap height gave a decreased thickness to 45 µm. Both tapes show a decrease in porosity when produced with the rotary ball mill.

Again, the tapes sintered well. However, localised holes were still present and impurities were seen in grain boundaries.

YSZ powder from Pi-Kem Ltd was milled in a rotary ball mill. The slurry composition was as follows:—

TABLE 3

|  | Chemical | Mass/g (2 dp) |
| --- | --- | --- |
| Powder | YSZ (Pi-Kem Ltd) | 20.00 |
| Solvent | Methyl ethyl ketone/ethanol (6:4 wt %) | 10.45 |
| Dispersant | Phosphate Ester (acid form) | 0.21 |
| Binder | PVB | 2.24 |
| Plasticizers | Polyethylene glycol (MW 300) | 1.62 |
|  | Di-butyl phthalate | 1.46 |

The green tape shows a higher porosity than the green tape produced from YSZ (Tioxide Ltd) particles. However, the relative viscosity of the two slurries, suggests that the YSZ (Pi-Kem Ltd) particles were much better dispersed.

The tape was shaped into the desired geometry (FIG. 4). They were heated to 600° C. at 0.5° C./min, then to 1000° C. at 0.8° C./min, followed by heating to 1500° C. at 10° C./min and sintering at 1500° C. for 5 hours. In order to reduce the impurities, an alumina plate was placed between the firing block and the samples. Tape thickness was greater than the tapes produced by YSZ (Tioxide Ltd) at 76 µm, and the tape was denser. Increase in thickness and density could be explained by decrease in slurry viscosity.

The main surface showed fewer impurities, but contained more holes. This could be attributed to the geometry effectively increasing tape thickness, hence more organic material having to pass through the outer surface.

It was found that towards the centre of the sintered rolled tape the layers of tape are in contact with each other and sintered together. However, the outer layer is only in contact with the rest of the sample in small sections.

PVB was shown to be a more effective binder than PMMA for production of green tapes. The smaller quantities of PVB required with respect to PMMA lead to denser tapes.

The time-scale used for ball milling (recommended by 'Tape Casting Theory & Practise' by Richard E Mistler and Eric R Twiname) shows use of the planetary ball mill produces more porous films.

The increased number of holes in the rolled tape's surface may be reduced when fired with porous anode and cathode, providing an easier escape route for the organic material.

Further Examples

The following examples of slurry formulations have been found to be better optimised than those presented above.

Electrolyte Formulations

| YSZ | 30.00 g | |
|---|---|---|
| Solvent | 14.50 g | MEK:ethanol 6:4 by weight |
| Dispersant | 0.195 g | Triton 0.44 |
| Binder | 3.36 g | PVB |
| Plasticisers | 2.43 g | polyethyleneglycol |
| | 2.19 g | di-butylphthalate |

Procedure 1. 14 g solvent+powder+dispersant. Ball mill 18 hrs at about 160 rpm.

2. Add plasticisers+binder+0.5 g solvent. Mix by vibratory mixer for about 20 min. Ball mill for 4 hrs at about 100 rpm.

3. De-air by rolling with no milling media at about 6 rpm for about 23 hrs.

4. Cast on tapecaster TT-1000 from Mistler & Co.
   Speed: 50%
   Doctor blade height: 0.3048 mm (0.012 inch)
   Carrier: Mylar Anode Formulations

| YSZ | 5.8633 g | weighed correct (by balance) to +/− 0.0002 g |
|---|---|---|
| NiO | 7.2570 g | |
| Graphite | 4.0984 g | |
| Solvent | 10.125 g | MEK:ethanol 6:4 by weight |

YSZ:NiO equivalent to 60:40 of YSZ:Ni by volume on reduction

NiO+YSZ:graphite is 50:50 by volume

Procedure

1. Ball mill for 18 hours at 160 rpm (ball mill has both rocking and rolling action) with

| Binder | PVB | 2.52 g |
|---|---|---|
| Plasticiser | di-butylphthalate | 1.643 g |
| | PEG | 1.823 g |

Note: no dispersion agent added

2. De-air. Ultrasonic agitation 30 min. Vacuum 5 inchHg (below atmospheric) 5 min.

Modifications

The above description refers to electrodes each consisting of a single uniform layer of sintered material. However, each of the electrodes could be constituted by composite layers which together fulfill the functions of the electrode, namely catalytic performance, electrochemical performance, electronic conduction, and gas distribution.

The anode and cathode may each be formed by two or more tapes laminated together to provide a gradation of function. Also, meshes or ribbons may be interspersed between the plural tapes, the meshes or tapes being burnt out during firing to form gas distribution channels. Alternatively the tapes may be appropriately scored using a serrated doctor-blade to provide such channels. In one example of cathode, a porous layer is formed next to the electrolyte from a mixture of YSZ and lanthanum strontium manganite or other electrode material, and a current collection layer with built-in channels is deposited on top of this, made from lanthanum strontium manganate.

An alternative material to nickel may be used to bridge the gap between the high temperature of the fuel cell anode and the low temperature of the incoming gas stream, suitably materials based on oxides such as lanthanum chromite. Indeed, the anode itself, or part of the anode, may be formed from oxide materials such as lanthanum chromite.

It will be appreciated that the process examples given above are by way of explanation of general principles, rather than precise examples of specific formulations. However, from this information the person skilled in the art will be able to arrive at suitable compositions and processes for practicing the invention, with no more than routine experimentation.

Although the preferred form of the invention is the S-shaped looped coil as shown in FIG. 4, the invention also includes the production of flat plate fuel cell components by firing flat tapes. Moreover, by simple rolling up of tapes followed by firing, tubular fuel cell components may be produced.

Materials other than YSZ may be used, for example scandia stabilised zirconia or scandia+yttria stabilised zirconia, suitably 8-14 mol % scandia+yttria, remainder zirconia; and other materials as discussed above.

Although described with particular reference to fuel cells, the invention may also be applied to devices for use in electrocatalysis or electrolysis in a range of gas based processes.

Other modifications and improvements may be made to the foregoing embodiments within the scope of the invention as defined in the claims.

The invention claimed is:

1. A component for use in a solid oxide fuel cell, the component comprising a continuous flexible tape having an anode layer on one side of a solid electrolyte layer and a cathode layer on the other side of the solid electrolyte layer, the component having a generally elongate tubular form comprising a central web of the continuous flexible tape dividing two channels comprising oppositely directed loops wound from the central web, one of the channels being entirely bounded by an anode surface of the anode layer and presenting the anode surface to material flowing therethrough, and the other channel being entirely bounded by a cathode surface of the cathode layer and presenting the cathode surface to material flowing therethrough, the remaining continuous flexible tape wound around the oppositely directed loops.

2. A component according to claim 1, in which the flexible tape is a green tape formed by slurry casting and solvent evaporation, and comprises at least three layers each of which is derived from a respective slurry comprising metal/ceramic particles dispersed in a carrier liquid; and after being wound the component is fired to produce a rigid component.

3. A component according to claim 2, in which the carrier liquid comprises a solvent optionally combined with one or more of a dispersant, a binder, and a plasticizer.

4. A component according to claim 2, in which the particles in each of the slurries are based on yttria stabilized zirconia (YSZ).

5. A component according to claim 2, in which the anode slurry comprises particles of YSZ and particles of Ni or NiO, and the cathode slurry comprises particles of YSZ and particles of Sr doped $LaMnO_3$.

6. A component according to claim 2, comprising a seal at one end; which is formed by a process wherein the green tape is formed with an electrolyte layer wider than the electrode layers and protruding from one side thereof, and in which, before firing, the green tape is wound into a cylindrical form and the protruding electrolyte layer is closed upon itself.

7. A fuel cell comprising a number of components as claimed in claim 1.

* * * * *